(12) United States Patent
Din et al.

(10) Patent No.: US 9,073,366 B1
(45) Date of Patent: Jul. 7, 2015

(54) ROTATIONAL PRINTING HEAD MODULE HAVING MUTI-CARTRIDGE

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Shih-Jer Din, New Taipei (TW); Jui-Feng Chang, New Taipei (TW); Clyde Ventolina Cordero, Singapore (SG)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 14/340,569

(22) Filed: Jul. 25, 2014

(51) Int. Cl.
*G01D 15/08* (2006.01)
*B41J 2/01* (2006.01)
*B41J 11/04* (2006.01)
*B29C 67/00* (2006.01)
*B41J 3/407* (2006.01)

(52) U.S. Cl.
CPC ............. *B41J 11/04* (2013.01); *B29C 67/0059* (2013.01); *B41J 3/4073* (2013.01)

(58) Field of Classification Search
USPC ......................................................... 347/160
See application file for complete search history.

(56) References Cited

U.S. PATENT DOCUMENTS

2005/0248065 A1* 11/2005 Owada .......................... 264/494
2015/0017271 A1* 1/2015 Donaldson et al. ........... 425/171

* cited by examiner

*Primary Examiner* — Lisa M Solomon
(74) *Attorney, Agent, or Firm* — Jianq Chyun IP Office

(57) ABSTRACT

The printing head module includes a bracket, a plurality of cartridges, a first piston, a pivot shaft, and a control unit. The bracket includes a plurality of through holes. The cartridges coaxially aligned with each other, each of the cartridges includes a leaning portion and contains the modeling material and a nozzle for extruding the modeling material. The leaning portion is leaning against the bracket when the cartridge is located at the printing position. The first piston is configured to slide along an extensional axis of the cartridge and drive the cartridge to move toward the printing position. The pivot shaft is connected to the bracket and adapted to rotate the cartridge to a working location. The control unit is coupled to the pivot shaft and the first piston for controlling the first piston and the rotation of the bracket.

10 Claims, 9 Drawing Sheets

ROTATIONAL PRINTING HEAD MODULE HAVING MUTI-CARTRIDGE

BACKGROUND OF THE INVENTION

1. Technical Field

The technical field relates to a printing head module, and more particularly to a 3D printing head module having rotational multiple cartridges.

2. Description of Related Art

With advancement in computer-aided manufacturing (CAM), a three dimensional printing technology (3-D printing technology) has been developed in the manufacturing industry, thereby rapidly fabricating products from an original design concept. The 3-D printing, in fact, is a general term of a series of rapid prototyping (RP) techniques, and the basic principle thereof, and the concept thereof is a laminate manufacturing, wherein a rapid prototyping machine is used to form cross-sectional shapes of a workpiece in the X-Y plane through scanning, shift intermittently at a layer thickness in the Z coordinates, and ultimately form 3-D objects. The 3-D printing technology is unrestrictedly applicable for the geometric shapes and the RP technology produces excellent outputs in particular for complex parts, which saves efforts and processing time significantly. As a result, the digital 3-D printing technology is capable of presenting an object of a digital 3-D model designed by means of computer-aided design (CAD) software under a shortest time requirement for the user to touch and actually feel the geometry of the model, or even to do possible functional test thereof.

Nevertheless, in the current 3-D printing apparatuses, the cartridge of the 3-D printing apparatus is required to be frequently replaced for refilling of the modeling material, or to be replaced with different cartridges with different modeling materials. Therefore, the current 3-D printing process often needs to be interrupted for the aforementioned replacement of the cartridges or the whole printing head. Moreover, the aforementioned cartridge replacement processes are time and manpower consuming, which greatly reduces the effectiveness of the current 3-D printing process, curbing the development of applications of 3-D printing process in mass production manufacturing.

SUMMARY

The present disclosure is directed to a printing head module, wherein the printing head module comprises the rotational multiple cartridges for applying in the 3-D printing process alternatively.

One of exemplary embodiments provides a printing head module configured to form a three-dimensional (3-D) object layer by layer with a modeling material on a carrying surface of a base. The printing head module includes a bracket, a plurality of cartridges, a first piston, a pivot shaft, and a control unit. The bracket includes a plurality of through holes. The cartridges are coaxially aligned with each other. The cartridge includes a leaning portion, and contains the modeling material and a nozzle for extruding the modeling material, therefrom, each of the cartridges are movably disposed in the corresponding through hole and adapted to move between an initial position and a printing position. The leaning portion is leaning against the bracket when the cartridge is located at the printing position. The first piston is configured to slide along an extensional axis of the cartridge and drive the printing cartridge to move from the initial position toward the printing position. The pivot shaft is connected to the bracket and adapted to rotate one of the cartridge to a working location aligned with the first piston for dispensing the modeling material. The control unit is coupled to the pivot shaft for controlling the rotation of the bracket and to the first piston for controlling the first piston, so as to drive the cartridge rotated to the working location to move from the initial position toward the printing position, wherein a distance between the base and the nozzle of the printing cartridge rotated to the working location is shorter than a distance between the base and the nozzles of the rest of the cartridges.

Based on the aforementioned description, the printing head module of the present disclosure utilizes rotating multi-cartridges which gives way to cater more cartridges. In this way, more types or colors of materials could be implemented in a single process without intervention. Furthermore, during the 3-D printing process, the printing cartridge rotated to the working location is pushed from an initial position to a printing position, wherein a distance between the base and the nozzle of the cartridge rotated to the working location is shorter than a distance between the base and the nozzles of the rest of the spare cartridges. As such, the rest of the cartridges not located at the working location are located at the initial position for preventing the rest of the cartridges interference with and smears the 3-D object on the base during the 3-D printing process. Accordingly, the effectiveness of printing head module could be greatly enhanced, and reduces the consumption of time and manpower.

To make the above features and advantages of the disclosure more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
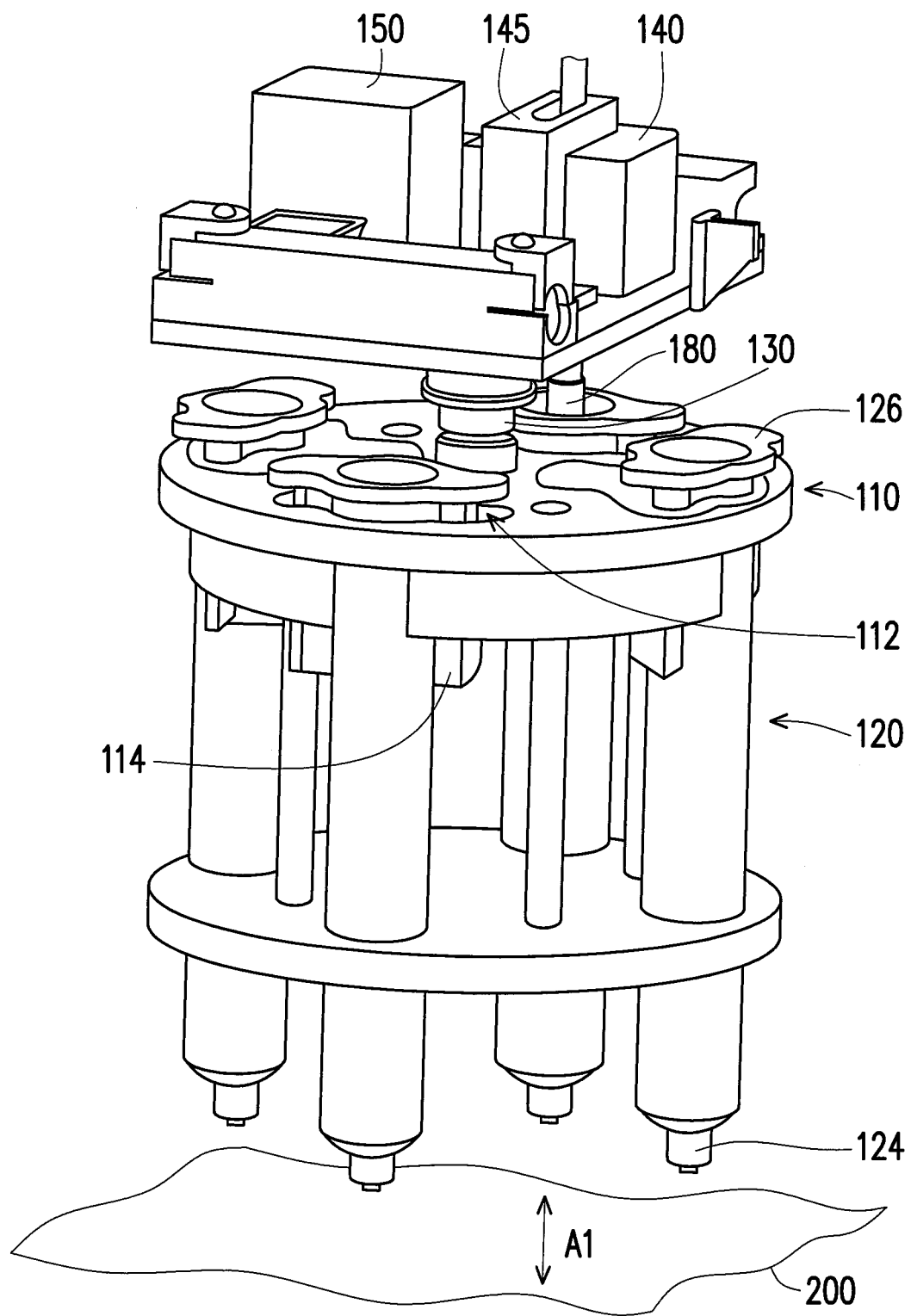
FIG. 1 is a schematic view of printing head module according to an exemplary embodiment.

It is to be understood that both of the foregoing and other detailed descriptions, features, and advantages are intended to be described more comprehensively by providing embodiments accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the exemplary embodiments. The present embodiment is approximately identical to the second embodiment, and same or similar reference numerals used in the present embodiment and in the second embodiment represent the same or similar elements.

FIG. 1 is a schematic view of a printing head module according to an exemplary embodiment. Referring to FIG. 1, in the present embodiment, a printing head module 100 is applicable to a three-dimensional (3-D) printing apparatus for printing a 3-D object on the base 200 according to digital 3-D model information. The 3-D printing apparatus may include a printing head module 100 and a base 200. In the present embodiment, the 3-D printing apparatus is configured to read the digital 3-D model information. Therein, the digital 3-D model information may be a digital 3-D image file which is built by a computer host using, for example, a computer-aided design (CAD) or an animation modeling software.

Furthermore, the printing head module 100 is movably disposed above the base 200, and configured to slide back and forth along a sliding rail, and the base 200 may also move relative to the printing head module 100. The 3-D printing apparatus is configured to read and process the digital 3-D model information, and controls the movements of the printing head module 100 relative to the base 200. Accordingly, the printing head module 100 may be moved along the sliding rail according to the digital 3-D model information, and the printing head module 100 is configured to dispense the modeling material 30 (shown in FIG. 4) layer-by-layer on the base 200 during the movement thereby forming a plurality of laminated material layers. The laminated material layers are stacked over one another to form the 3-D object.

Figure 2:
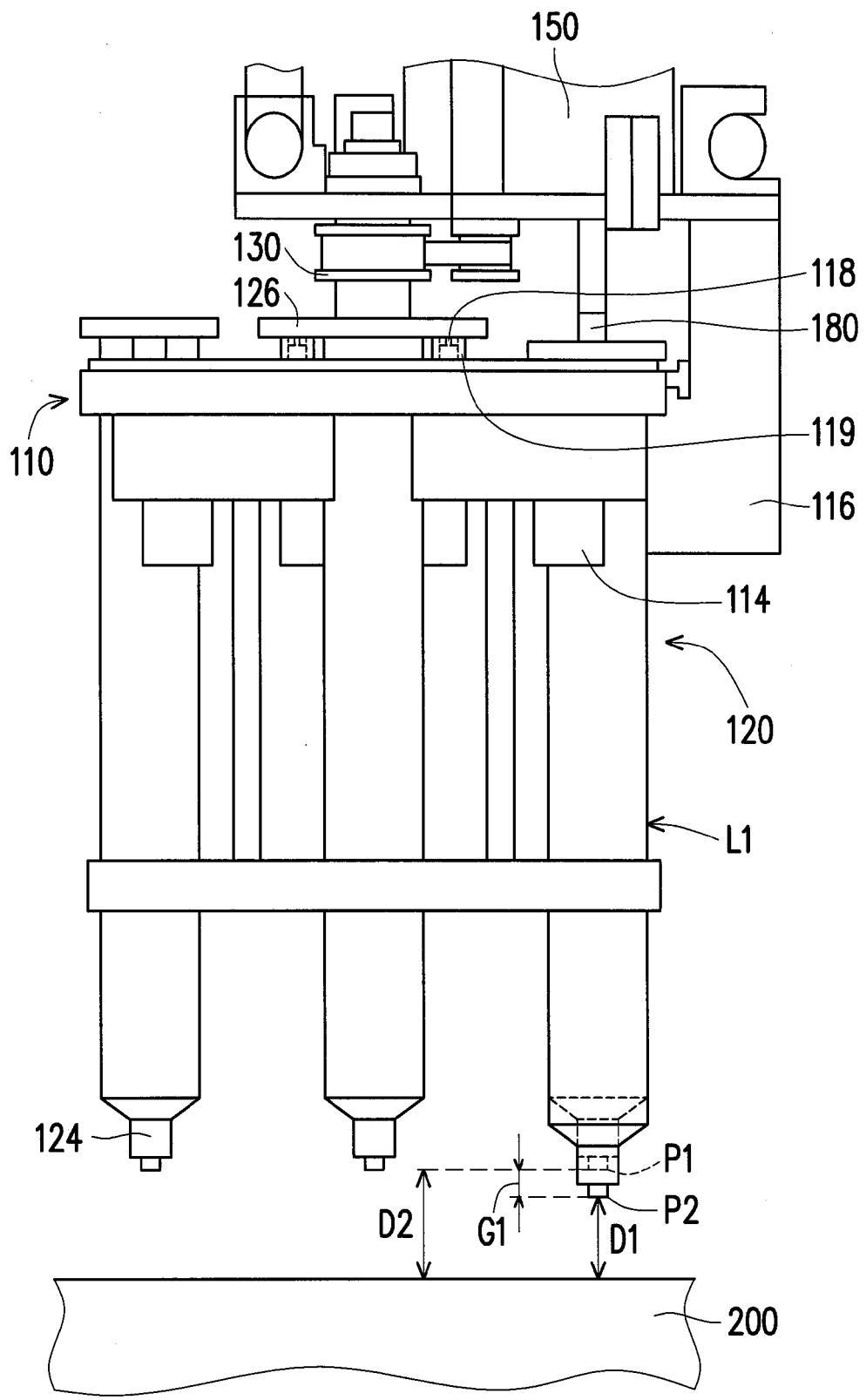
FIG. 2 illustrated a scenario of one of the cartridges moving into the printing position according to an exemplary embodiment.

FIG. 2 illustrated a scenario of one of the cartridge moving into the printing position according to an exemplary embodiment. Referring to FIG. 1 and FIG. 2, the printing head module includes a bracket 110, a plurality of cartridges 120, a pivot shaft 130, a first piston 180 and a control unit 145. The printing head module 100 may further include a supporter 116. The supporter 116 is connected to the abovementioned sliding rail. The bracket 110 may include a plurality of through holes 112 corresponding to the cartridges 120, and aligner holders 114. Each of the cartridges 120 may include a leaning portion 126 and contain the modeling material 30 and a nozzle 124 for extruding the modeling material 30. Each of the cartridges 120 movably disposed in the corresponding through holes 112 and adapted to move between an initial position P1 and a printing position P2, the leaning portion 126 leans against the bracket 110 when the cartridge 120 located at the printing position P2. A gap G1 exists between the initial position P1 and a printing position P2. The first piston 180 is configured to slide along an extensional axis A1 of the printing cartridge 120 and drive the printing cartridge 120 to move from the initial position P1 toward the printing position P2. The pivot shaft 130 connected to the bracket 110, and adapted to rotate the printing cartridge 120 to a location aligned with the first piston 180 for dispensing the modeling material 30. The control unit 145 is coupled to the first piston 180 and the pivot shaft 130 for controlling the rotation of the bracket 110 and controlling the first piston 180 to drive the cartridge 120 rotated to the location to move from the initial position P1 toward the printing position P2 as shown in FIG. 2, such that a distance D1 between the base 200 and the nozzle 124 of the printing cartridge 120 rotated to the location is shorter than a distance D2 between the base 200 and the nozzles 124 of the rest of the cartridges 120.

Figure 3:
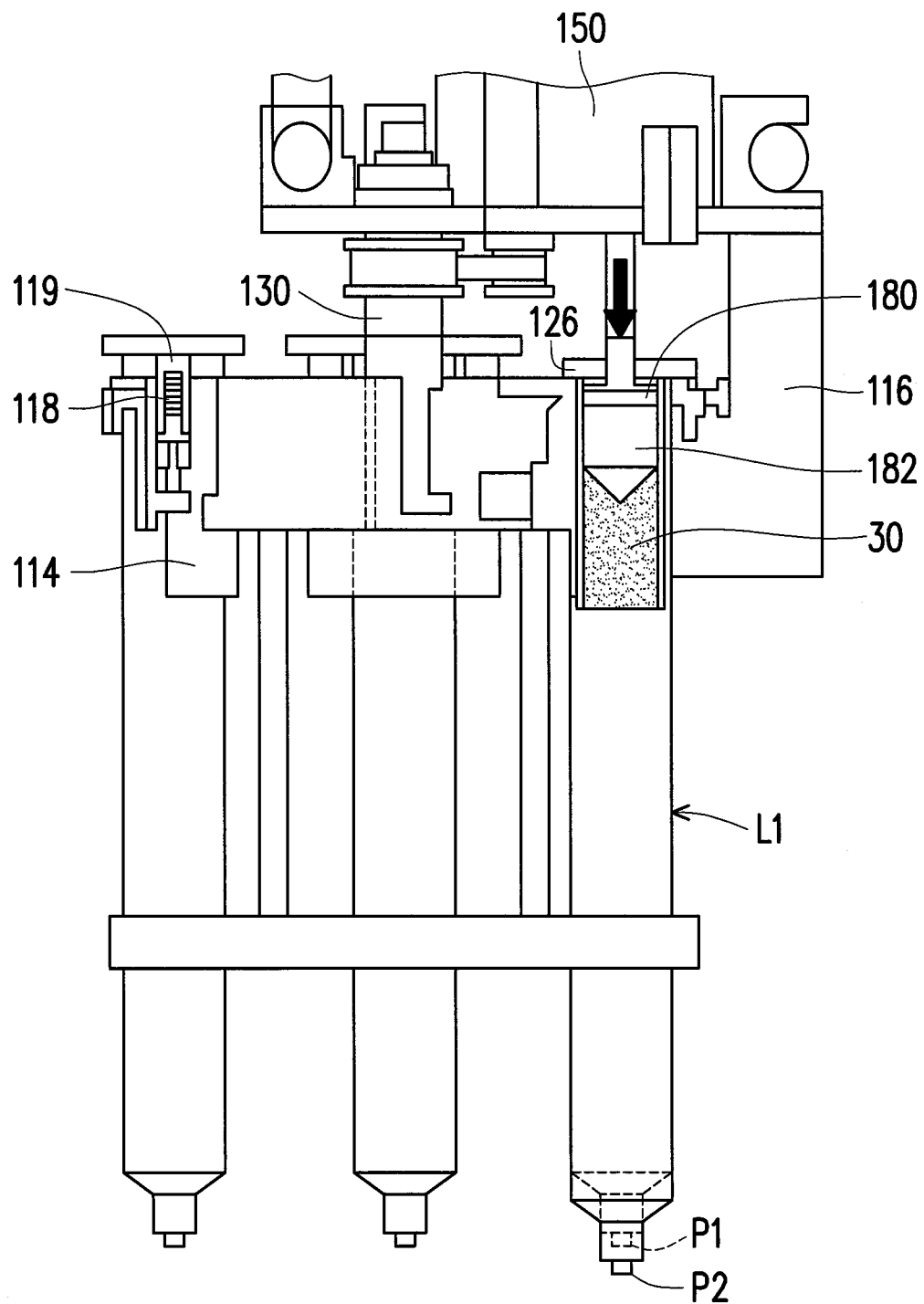
FIG. 3 is the perspective view of the printing head module of FIG. 2 according to an exemplary embodiment.

FIG. 2 illustrated a scenario that one of the cartridges moving into the printing position according to an exemplary embodiment. FIG. 3 is the perspective view of the cartridge of FIG. 2 according to an exemplary embodiment. Referring FIG. 2 and FIG. 3, the bracket 110 may include a plurality of aligner holders 114 for detachably holding and locking the cartridges 120 in the through holes 112. In addition, the aligner holder 114 composed of a spring actuated plastic part. The configuration of the aligner holder 114 on the bracket 110 allows a simple and quick fixing and replacement method of the cartridges 120 without any types of screw-fixing elements. The cartridges 120 could be quickly detached from the bracket 110 by a user, which greatly reduces the time spending on the replacement of the cartridges 120 and the effectiveness of the present 3D printing apparatus could be greatly improved in terms of the consumption of time and manpower.

Furthermore, the aligner holder 114 may have a spring cap 119 and a push-spring 118 disposed between the leaning portion 126 and the bracket 110, so as to restore the leaning portion 126 from the printing position P2 back to the initial position P1 when the cartridge 120 leaves the location aligned with the first piston 180. Moreover, a linear motor 140 as shown in FIG. 1 may be coupled to the bracket 110, wherein the force applied by the linear motor 140 may assist the cartridge 120 rotated to a working location L1 aligned with the first piston 180 to overcome the elastic restoring force of the push-up spring 118, so as to push the printing cartridge 120 rotated to the working location L1 down to the printing position P2 for printing. Therefore, the printing cartridge 120 could be moved between the initial position P1 and the printing position P2 by receiving the push-down force from the linear motor 140 and the elastic restoring force from the push-up spring 118. Accordingly, during the 3-D printing process, the rest of the cartridges 120 not located at the working location L1 for printing may be restored to the initial position P1 for preventing the interference and smearing of printed object during the 3-D printing process.

In addition, referring to the FIG. 1 and FIG. 2, the pivot shaft 130 could rotate the bracket 110 and switch the cartridge 120 through the control unit 145 when the printing cartridge 120 is running out of the modeling material or it is needed to switch to different kinds of material or colors of the modeling material during a 3-D printing process. In the present embodiment, the different kinds of modeling material could be filled in each of the different cartridges 120 and to be dispensed according to the digital 3-D model information. Therefore, the procedures of dispensing different kinds of materials could be completed without the needs of manual replacing or refilling the cartridges 120 frequently. Otherwise, with the configuration of the control unit 145, a predetermined interleaved printing schedule of different kinds of materials may be applied to the printing head module 100 for a multi-material or multi-color 3D printing object.

Figure 4:
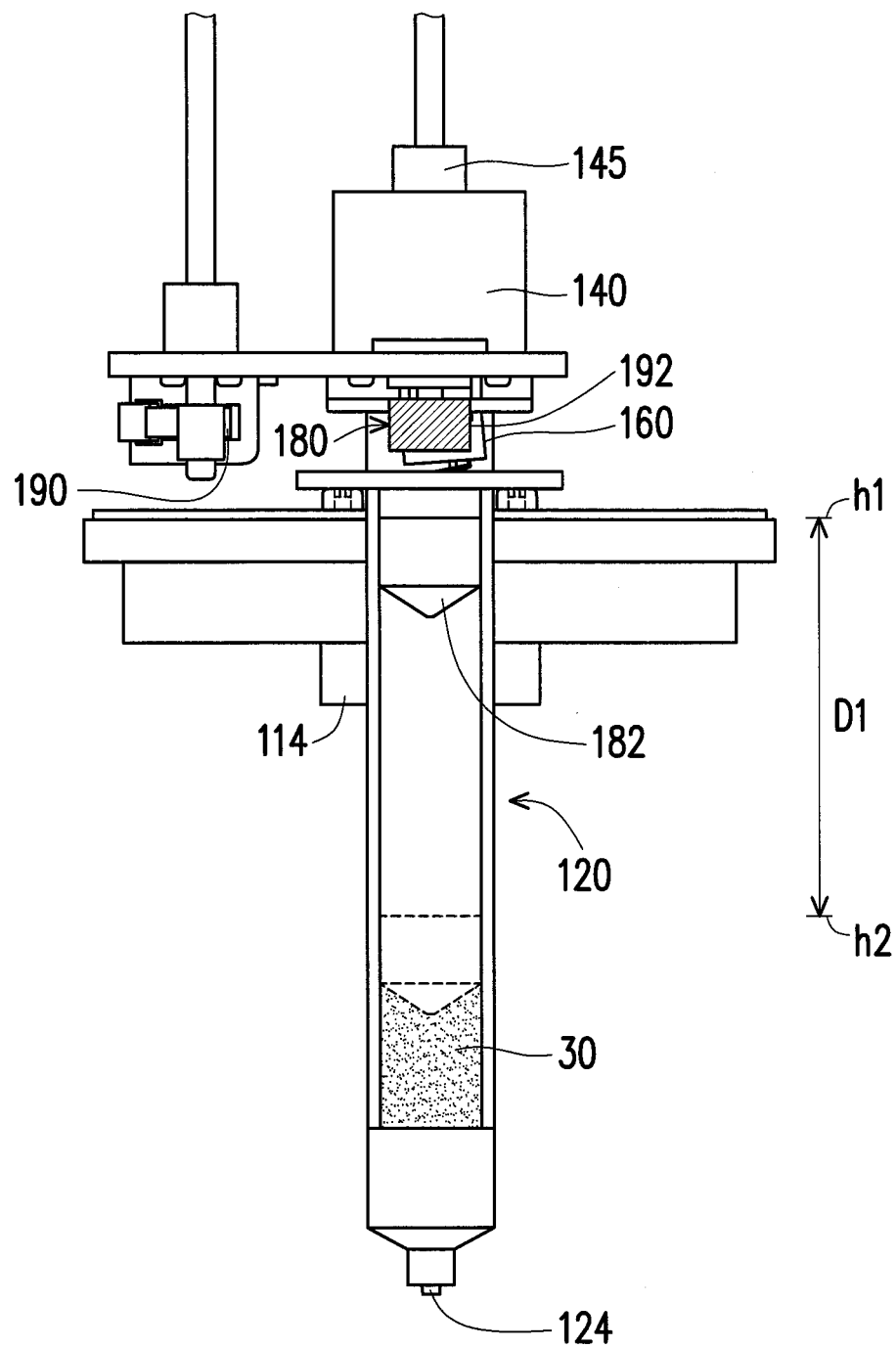
FIG. 4 is a partial perspective view of FIG. 4 of the printing cartridge in the printing position.

FIG. 3 is a schematic view of the printing head module according to the exemplary embodiment. FIG. 4 is a partial perspective view of FIG. 3 of the cartridge in the printing position. Referring to the FIG. 3 and FIG. 4, in the present embodiment, the cartridge 120 may further include a plurality of second pistons 182. The second pistons 182 contacts the surface level of the modeling material containing in the cartridges 120 and is adapted to be pushed by the first piston 180 to move downwards from the initial position P1 toward the corresponding nozzle 124 to extrude out the modeling material 30. Otherwise, the first and the second detecting units 190, 192 may be disposed on the bracket for detecting the movement of the first and the second pistons 180, 182. When the printing cartridge 120 moves from its initial position P1 to the printing position P2, and the leaning position 126 contacts the bracket 110, the second detecting unit 192 is triggered to generate an initial signal accordingly. The control unit 145 receives the initial signal and drives the linear motor 140 to push the first piston 180 to contact with the second piston at a first position h1. Then control unit 145 continuously drives the first piston 180 through the linear motor 140 to move the second piston to a second position h2, while the driven force from the control unit 145 is terminated. The second detecting unit 192 simultaneously generates the termination signal accordingly and the termination signal is transmitted to the control unit 145. Based on the detection signal from first and second detecting units 190 and 192, the control unit 145 calculates the difference D1 between the first position h1 and the second position h2, which represents the moving distance of second piston 192. Moreover, the control unit 145 may further calculate the remaining or dispensing amount of the modeling material 30 based on the movement distance of second piston 192.

Figure 5A:
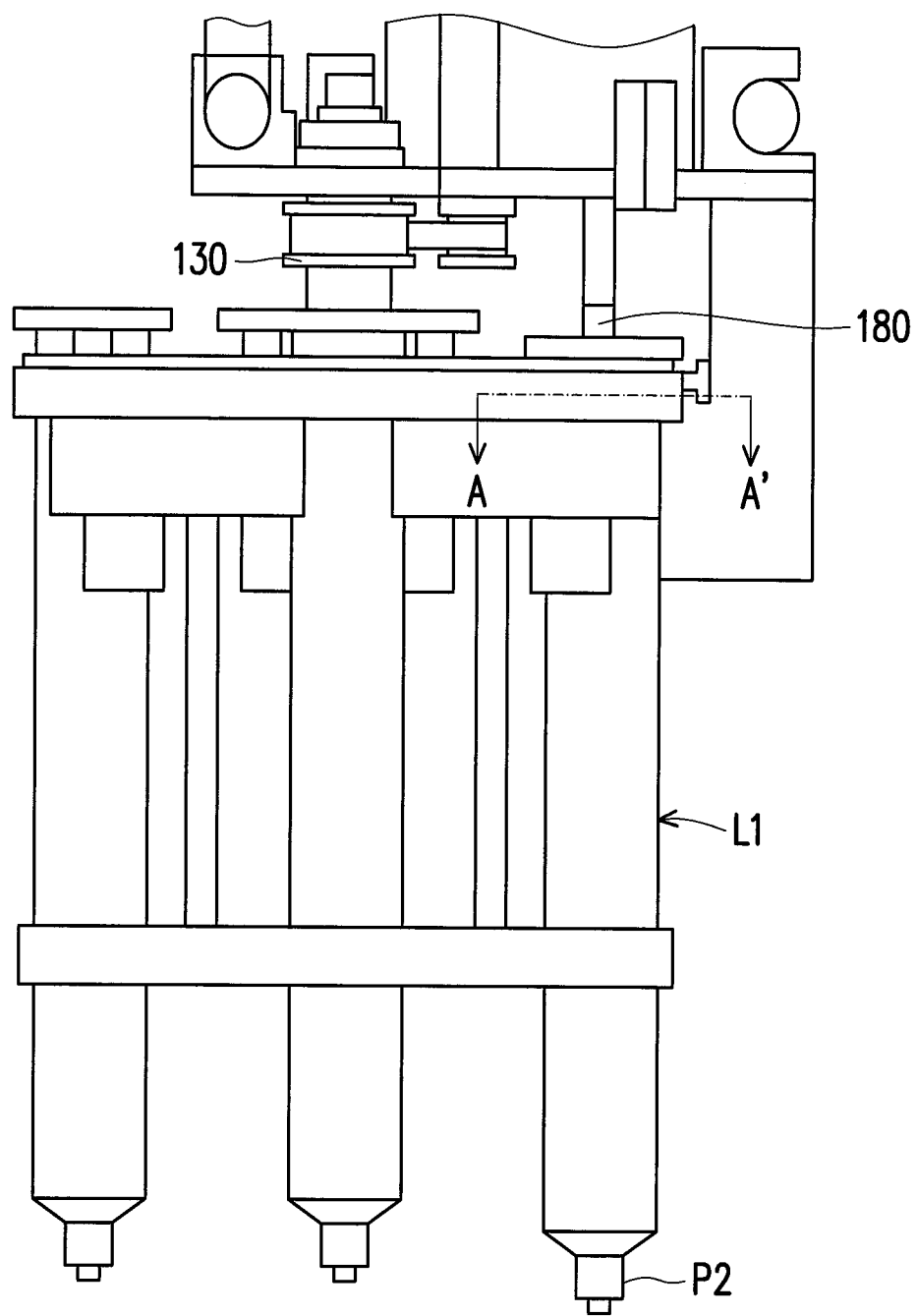
FIG. 5A is the schematic view of the printing head module according to an exemplary embodiment.
Figure 5B:
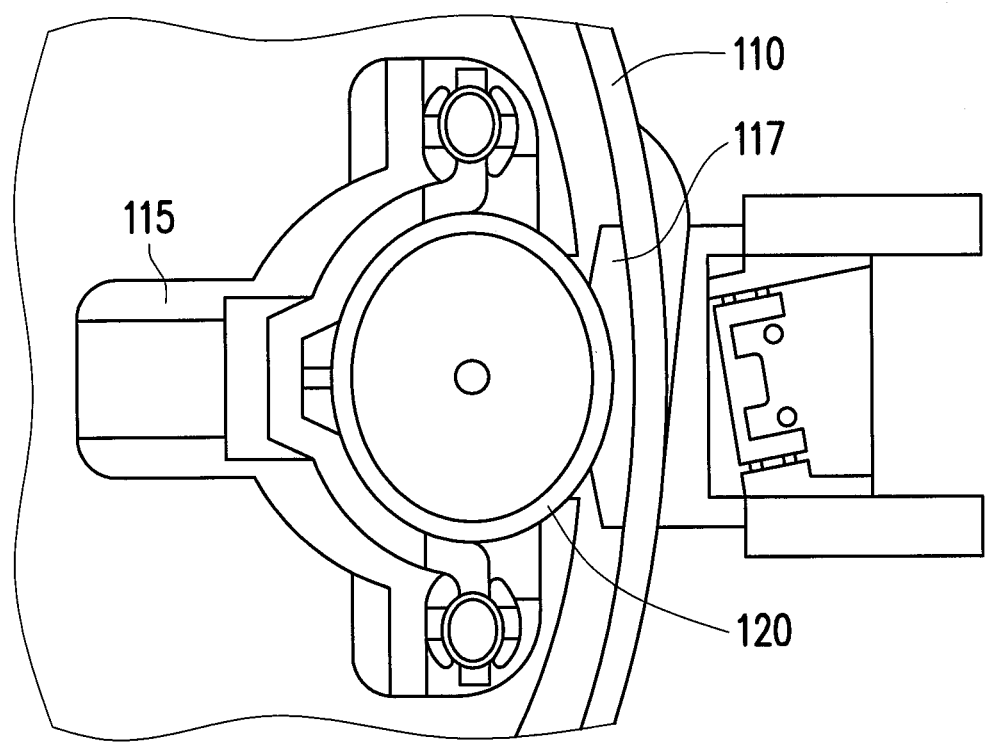
FIG. 5B is the partial cross-sectional view along the line A-A' of FIG. 5A.

FIG. 5A is the schematic view of the printing head module according to an exemplary embodiment. FIG. 5B is the partial cross-sectional view of FIG. 5A along the line A-A'. Referring to FIG. 5A and FIG. 5B, The bracket 110 may also include an aligner spring 115 and a centering feature 117 disposed corresponding to the working location L1 for leaning against the printing cartridge 120 rotated to the working location L1 for positioning and centering the printing cartridge 120. The aligner spring 115 and a centering feature 117 are adapted to respectively lean against two opposite sides of the printing head 120 rotated to the working location L1 for positioning and centering the printing cartridge 120 rotated to the working location L1. With the configuration of the aligner spring 115 and centering feature 117, the aligner spring 115 and centering feature 117 push the printing cartridge 120 to the working location L1 from the opposite sides, such that the printing cartridge 120 to the working location L1 is aligned with the first piston 180. Therefore, the first piston 180 could be quickly aligned to the position suitable for pushing the second piston 182 (shown in FIG. 4), or otherwise, the contact position of the first piston 180 and the second piston 182 may be deviated from time to time, and the applying force from the first piston 180 to the second piston 182 may be dissipated to other directions. Thus, the amount of dispensing modeling material may be not constant and unpredictable from time to time, this will also result to offset printing from each cartridge 120, thus influence the printing quality of the 3D printing objects.

Figure 6A:
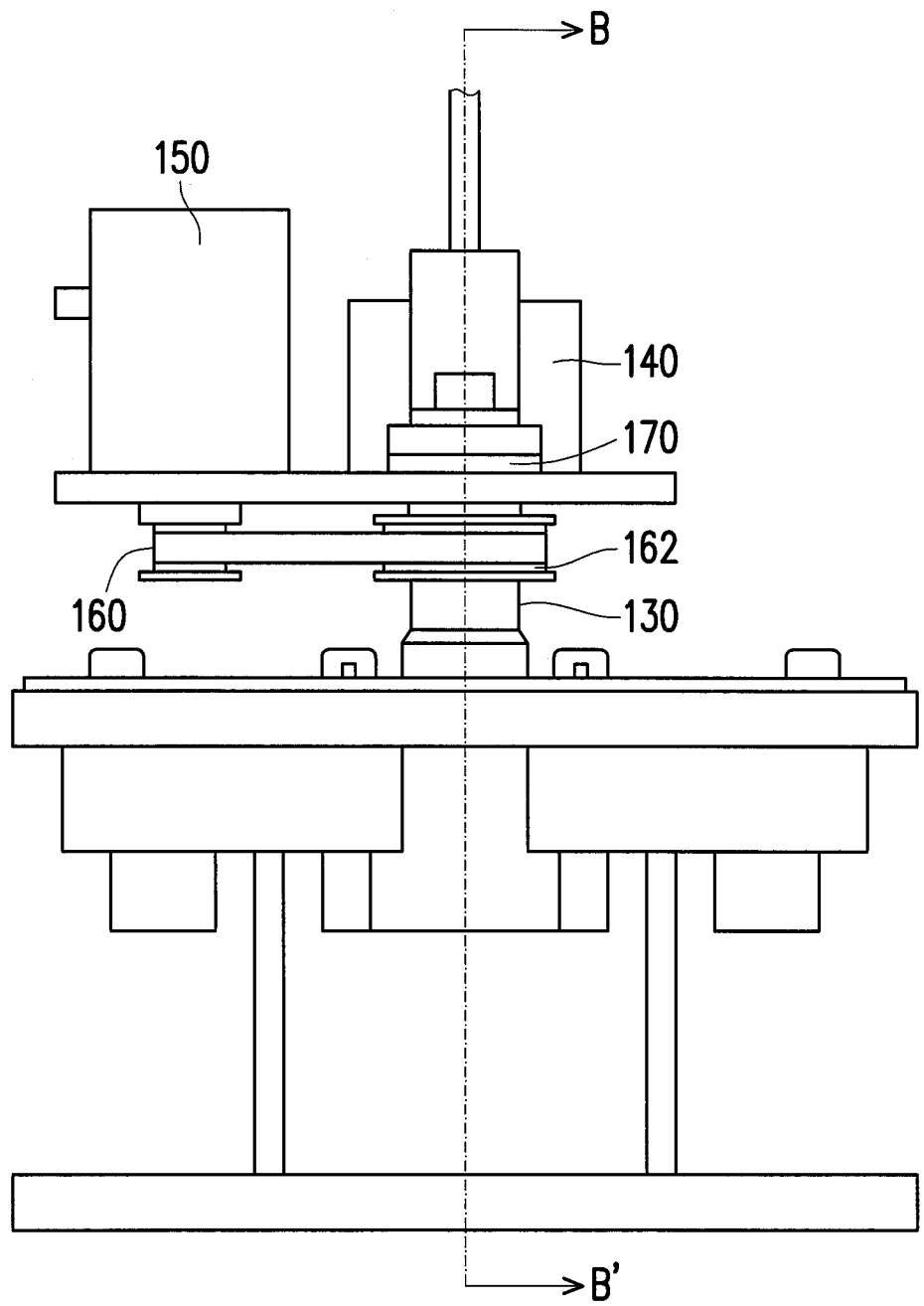
FIG. 6A is the partial schematic view of the printing head module according to an exemplary embodiment.
Figure 6B:
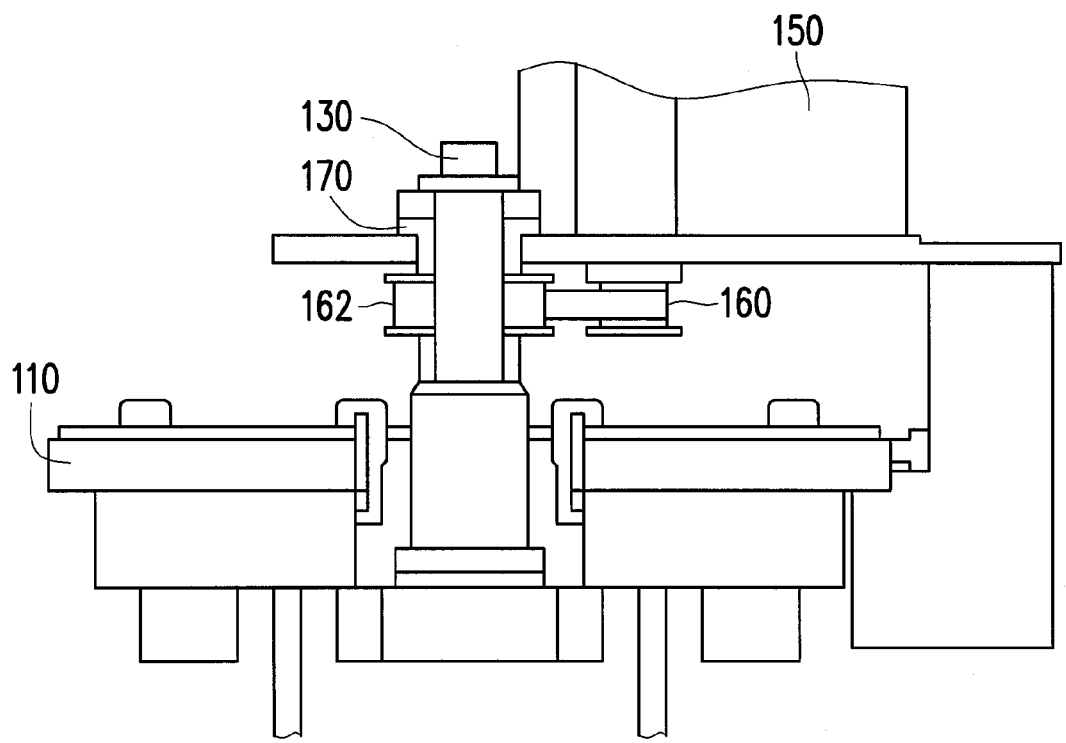
FIG. 6B is the cross-sectional view along the line B-B' of the FIG. 6A.

FIG. 6A is the partial schematic view of the printing head module according to an exemplary embodiment, FIG. 6B is the cross-sectional view along the line B-B' of the FIG. 6A. Referring to FIG. 6A and FIG. 6B, in the present embodiment, a washer 170 such as a standard oil free bushing may surround the pivot shaft 130 and leaned between the bracket 110 and the pivot shaft 130, such that the pivot shaft 130 could be rotated smoothly, and the concussion of the pivot shaft 130 during the printing process could be reduced. Accordingly, the quality of 3-D printing apparatus could be enhanced. Moreover, a drive pulley 160 could be configured and connected between a driving motor 150 and the pivot shaft 130 for driving the pivot shaft 130 to rotate, so as to rotate the bracket 110 to switch the cartridges 120 and the different modeling material for dispensing. Furthermore, a reduction pulley 162 may be disposed along the rotational axis of the pivot shaft 130 and configured with the drive pulley 160 for speed reduction. Namely, the rotating speed of the pivot shaft 130 could be adjusted through the configuration of the drive pulley 160 and the reduction pulley 162.

Figure 7:
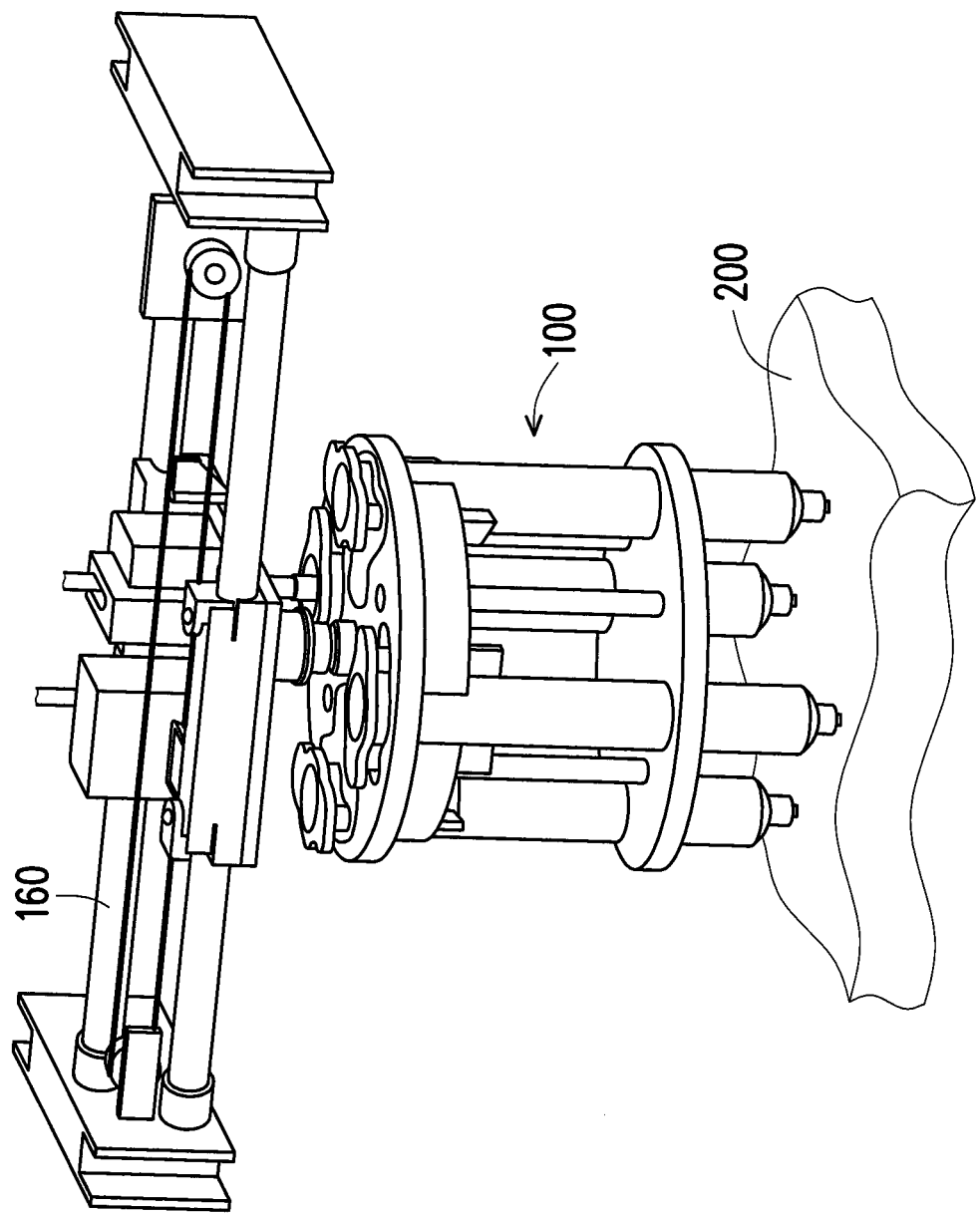
FIG. 7 is the schematic view of the printing head module according to another exemplary embodiment.

FIG. 7 is the schematic view of the printing head module according to an exemplary embodiment. The printing head module 100 may be slidably disposed on a sliding rail 160. The siding rail 160 is provided for moving the printing head module 100 in X direction of a working plane parallel to the top surface of the base 200 through the drive of a pulley and belt. Moreover, the sliding rail 160 might be coupled with the control unit 145 for computing the moving pitch or moving rate of the printing head module 100. Accordingly, the predetermined working routes of printing head module 100 for the modeling material 30 dispensing could be installed in the control unit 145 depending on the shapes or printing area of the final 3-D printing products.

In summary, the printing head module of the present disclosure having multiple cartridges is capable of dispensing different kinds of modeling materials through a single printing head module. Therefore, a multi-material or multi-color 3D printing process might be processed without the intervention of replacing the printing heads or refilling the cartridge with different kinds of the modeling materials. Furthermore, during the 3-D printing process, the cartridge rotated to the working location is pushed from an initial position to a printing position, wherein a distance between the base and the nozzle of the printing cartridge rotated to the working location is shorter than a distance between the base and the nozzles of the rest of the cartridges. As such, the rest of the cartridges not located at the working location are located at the initial position for preventing the rest of the printing heads interference with and smears the 3-D object on the base during the 3-D printing process. Accordingly, the time and manpower consumption could be greatly reduced due to great decreasing of the switch frequency of the printing head or cartridge. In this regards, the effectiveness of 3-D printing process could be greatly enhanced.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A printing head module configured to dispense a modeling material layer by layer to form a three-dimensional object on a base, the printing head module comprising:
    a bracket comprising a plurality of through holes;
    a plurality of cartridges coaxially aligned with each other, each of the cartridges comprising a leaning portion and containing the modeling material and a nozzle for extruding the modeling material therefrom, each of the cartridges movably disposed in the corresponding through hole and adapted to move between an initial position and a printing position, the leaning portion leaning against the bracket when the cartridge located at the printing position;
    a first piston configured to slide along an extensional axis of the cartridge and drive a printing cartridge to move from the initial position toward the printing position;
    a pivot shaft, connected to the bracket and adapted to rotate the cartridge to a working location aligned with the first piston for dispensing the modeling material; and
    a control unit, coupled to the pivot shaft for controlling the rotation of the bracket and to the first piston for controlling the first piston, so as to drive the cartridge rotated to the working location to move from the initial position toward the printing position, wherein a distance between the base and the nozzle of the printing cartridge rotated to the working location is shorter than a distance between the base and the nozzles of the rest of the cartridges.

2. The printing head module as claimed in claim 1, wherein the bracket comprises a plurality of aligner holders for holding and locking the cartridges in the corresponding through holes.

3. The printing head module as claimed in claim 2, further comprising a plurality of second piston, respectively disposed in the cartridges, wherein the first piston is adapted to push one of the second pistons towards the corresponding nozzle to extrude out the modeling material.

4. The printing head module as claimed in claim 1, wherein the bracket further comprises an aligner spring and a centering feature, disposed corresponding to the location, the aligner spring and a centering feature adapted to respectively lean against two opposite sides of the printing cartridge to the location for positioning and centering the printing cartridge rotated to the working location.

5. The printing head module as claimed in claim 1, further comprising a push-up spring disposed between the leaning portion and the bracket, so as to restore the leaning portion from the printing position back to the initial position.

6. The printing head module as claimed in claim 5, further comprising a spring cap, covering an end of the push-up spring and leaning between the push-up spring and the leaning portion.

7. The printing head module as claimed in claim 5, further comprising a linear motor, coupled to the bracket and connected to the first piston, wherein the linear motor overcomes the elastic restoring force of the push-up spring, so as to drive the first piston to push the printing cartridge rotated to the working location to the printing position for dispensing the corresponding modeling material through the corresponding nozzle.

8. The printing head module as claimed in claim 1, further comprising a drive pulley connected between a driving motor and the pivot shaft, so as to drive the pivot shaft to rotate.

9. The printing head module as claimed in claim 1, further comprising a washer surrounding the pivot shaft and leaning between the bracket and the pivot shaft.

10. The printing head module as claimed in claim 1, wherein the printing head module is slidably disposed on a sliding rail, such that the printing head module is configured to slide back and forth along the sliding rail.

* * * * *